US011639735B2

(12) United States Patent
Hamada

(10) Patent No.: US 11,639,735 B2
(45) Date of Patent: May 2, 2023

(54) FASTENER

(71) Applicant: Aoyama Seisakusho CO., LTD., Aichi (JP)

(72) Inventor: Masahiko Hamada, Aichi (JP)

(73) Assignee: Aoyama Seisakusho CO., LTD., Niwa-gun (JP)

( * ) Notice: Subject to any disclaimer, the term of this patent is extended or adjusted under 35 U.S.C. 154(b) by 234 days.

(21) Appl. No.: 16/908,216

(22) Filed: Jun. 22, 2020

(65) Prior Publication Data

US 2020/0408239 A1 Dec. 31, 2020

(30) Foreign Application Priority Data

Jun. 25, 2019 (JP) .............................. JP2019-117778

(51) Int. Cl.
*F16B 39/00* (2006.01)
*F16B 33/00* (2006.01)
(Continued)

(52) U.S. Cl.
CPC .......... *F16B 33/002* (2013.01); *F16B 41/005* (2013.01); *F16B 2043/008* (2013.01)

(58) Field of Classification Search
CPC ...... F16B 39/103; F16B 33/08; F16B 33/002; F16B 37/14; F16B 2043/008; F16B 41/005
(Continued)

(56) References Cited

U.S. PATENT DOCUMENTS 5,340,255 A * 8/1994 Duran ................... F16B 21/165
411/429
6,257,813 B1 * 7/2001 Tanimura ................ B25B 21/00
411/536
(Continued)

FOREIGN PATENT DOCUMENTS

JP S48-019854 U 3/1973
JP S59-037419 U 3/1984
(Continued)

OTHER PUBLICATIONS

McGard Japan, Automotive Products, license plate lock, retrieved on Jun. 4, 2020, http://www.mcgard.jp/number.html [English translation is not submitted, but it is discussed on p. 1 of the specification, therefore it is believed that the requirement for a concise explanation is satisfied].

*Primary Examiner* — Gary W Estremsky
(74) *Attorney, Agent, or Firm* — Muncy, Geissler, Olds & Lowe, P.C.

(57) ABSTRACT

A fastener to fasten a member to be fastened includes a shaft portion, a tool working surface, and an external operation restricting portion. The shaft portion is provided with a male thread configured to be rotated about an axis line to work so as to fasten the member to be fastened. The tool working surface is formed to a tool working portion integrated with the shaft portion. A tool to rotate the shaft portion works to the tool working surface. The external operation restricting portion is configured to restrict the rotation of the shaft portion through an operation from outside the fastener. In this fastener, the tool working surface to which the tool works is formed in an approximately cylindrical inner surface shape.

4 Claims, 7 Drawing Sheets

(51) Int. Cl.
*F16B 41/00* (2006.01)
*F16B 43/00* (2006.01)

(58) Field of Classification Search
USPC ....... 411/403, 975, 372.5, 166; 70/231, 232, 70/165, 188, 218
See application file for complete search history.

(56) References Cited

U.S. PATENT DOCUMENTS

| | | | | |
|---|---|---|---|---|
| 7,172,381 | B2 * | 2/2007 | Miyazaki | F16B 37/14 411/429 |
| 7,445,414 | B1 * | 11/2008 | Notaro | F16B 23/0007 411/432 |
| 8,282,327 | B2 * | 10/2012 | Miyagawa | F16B 37/14 411/533 |
| 10,968,942 | B1 * | 4/2021 | Neidigk | F16B 37/14 |
| 2004/0154361 | A1 * | 8/2004 | Trempala | E05B 35/008 70/169 |
| 2013/0071204 | A1 * | 3/2013 | Hunter | F16B 37/14 411/429 |
| 2014/0105704 | A1 * | 4/2014 | Groppo | B60B 3/165 411/403 |
| 2014/0178147 | A1 * | 6/2014 | Lin | F16B 41/005 411/197 |
| 2015/0152936 | A1 * | 6/2015 | Kim | F16F 9/5126 188/313 |
| 2016/0102700 | A1 * | 4/2016 | Ulrich | F16B 23/0053 411/166 |
| 2017/0291743 | A1 * | 10/2017 | Kobylinski | F16L 55/1141 |

FOREIGN PATENT DOCUMENTS

| JP | 2014-159863 A | 9/2014 |
|---|---|---|
| JP | 2018-048656 A | 3/2018 |

* cited by examiner

REAR ← → FRONT

FASTENER

BACKGROUND

1. Technical Field

The present invention relates to a technique to fasten a member to be fastened by screw-fastening, and especially relates to a technique to make a release of a fastened state by a fraudulent method difficult.

2. Related Art

To protect a license plate of an automobile from a theft, it has been variously attempted that an anti-theft function is provided to a bolt used for mounting the license plate to make removal of the license plate after the mounting difficult. For example, McGard (Automotive Products, license plate lock, McGard Japan [searched on Apr. 19, 2019], Internet <http://www.mcgard.jp/number.html>) proposes to form an operation hole for rotating a bolt in a particular shape, thus making the removal without using a dedicated tool difficult.

However, even with the operation hole having the particular shape, depending on the shape of the operation hole, the license plate can be removed by rotating the bolt using various kinds of generally distributed tools in some cases. Therefore, Japanese Unexamined Patent Application Publication No. 2014-159863 discloses that after fastening a bolt body, an operation hole into which a dedicated fastening tool for fastening a bolt is inserted is filled with a fitting material. While the method disclosed in Japanese Unexamined Patent Application Publication No. 2014-159863 ensures effectively restricting the removal of the license plate, the work to fill the operation hole with the fitting material is necessary when mounting the license plate, thus possibly complicating the mounting work of the license plate.

Thus, for the bolt used for mounting the license plate, it is difficult to effectively restrict the removal of the license plate and to suppress complicating the mounting work of the license plate. This problem is not limited to the bolt for mounting the license plate, but common to fasteners for fastening various kinds of members to be fastened where releasing the fastened states are preferred to be restricted.

The present invention has been made to solve the above-described conventional problem, and it is an object of the present invention to provide a technique to restrict releasing a fastened state by a fraudulent method with more certainty while avoiding complicating a fastening work.

SUMMARY

To achieve at least a part of the object, a fastener of the present invention is a fastener for fastening a member to be fastened using a tool. The fastener includes a shaft portion, a tool working surface, and an external operation restricting portion. The shaft portion is provided with a male thread configured to be rotated about an axis line to work so as to fasten the member to be fastened. The tool working surface is formed to a tool working portion integrated with the shaft portion. The tool works on the tool working surface to rotate the shaft portion. The external operation restricting portion is configured to restrict the rotation of the shaft portion through an operation from outside the fastener. The tool working surface is formed in an approximately cylindrical inner surface shape.

According to the configuration, by forming the tool working surface in the approximately cylindrical inner surface shape, the rotation of the shaft portion by a fraudulent tool inserted into a tool hole having the tool working surface as the inner surface is restricted, and the rotation of the shaft portion through an external operation is restricted, thus ensuring restricting release of the fastened state by a fraudulent method. Since the rotation of the shaft portion by the fraudulent tool is restricted by forming the tool working surface in the approximately cylindrical inner surface shape, a work to fill the tool hole and the like can be omitted, thus ensuring suppression of complicating the fastening work.

The external operation restricting portion may be disposed on an outer peripheral side of the tool working portion, and may be a collar that houses the tool working portion and is rotatably held between the tool working portion and the member to be fastened in a state where the member to be fastened is fastened.

This configuration ensures restricting the rotation of the shaft portion through the external operation with more certainty.

The fastener that includes the collar as the external operation restricting portion may further include a biasing member configured to press the collar to the tool working portion. The collar may be configured to house the biasing member.

According to this configuration, since the collar is pressed against the tool working portion, an abnormal noise, which is caused by the collar moving in an axial direction to contact the tool working portion and the member to be fastened, can be suppressed.

The fastener that includes the collar as the external operation restricting portion may further include a washer disposed between the tool working portion and the member to be fastened. The washer may transmit a tightening load applied to the member to be fastened by the tool working portion. The collar may be configured to house a part of the washer.

According to this configuration, since the washer can be interposed between the tool working portion to which the rotating operation is performed when fastening and the member to be fastened, this can suppress a scratch generated on the member to be fastened due to the rotation of the tool working portion.

The external operation restricting portion may be a side surface of the tool working portion. The side surface may be formed to have an outer diameter increasing toward the shaft portion.

According to this configuration, since the configuration of the fastener can be more simplified, the manufacturing cost of the fastener can be further reduced.

DETAILED DESCRIPTION

The embodiments of the present invention will be described in the following order.
A. First Embodiment:
   A1. Fastener Configuration:
   A2. Exemplary Use of Fastener:
   A3. Function of Fastener:
B. Second Embodiment:
C. Third Embodiment:
D. Modification:

A. FIRST EMBODIMENT

A1. Fastener Configuration

Figure 1:
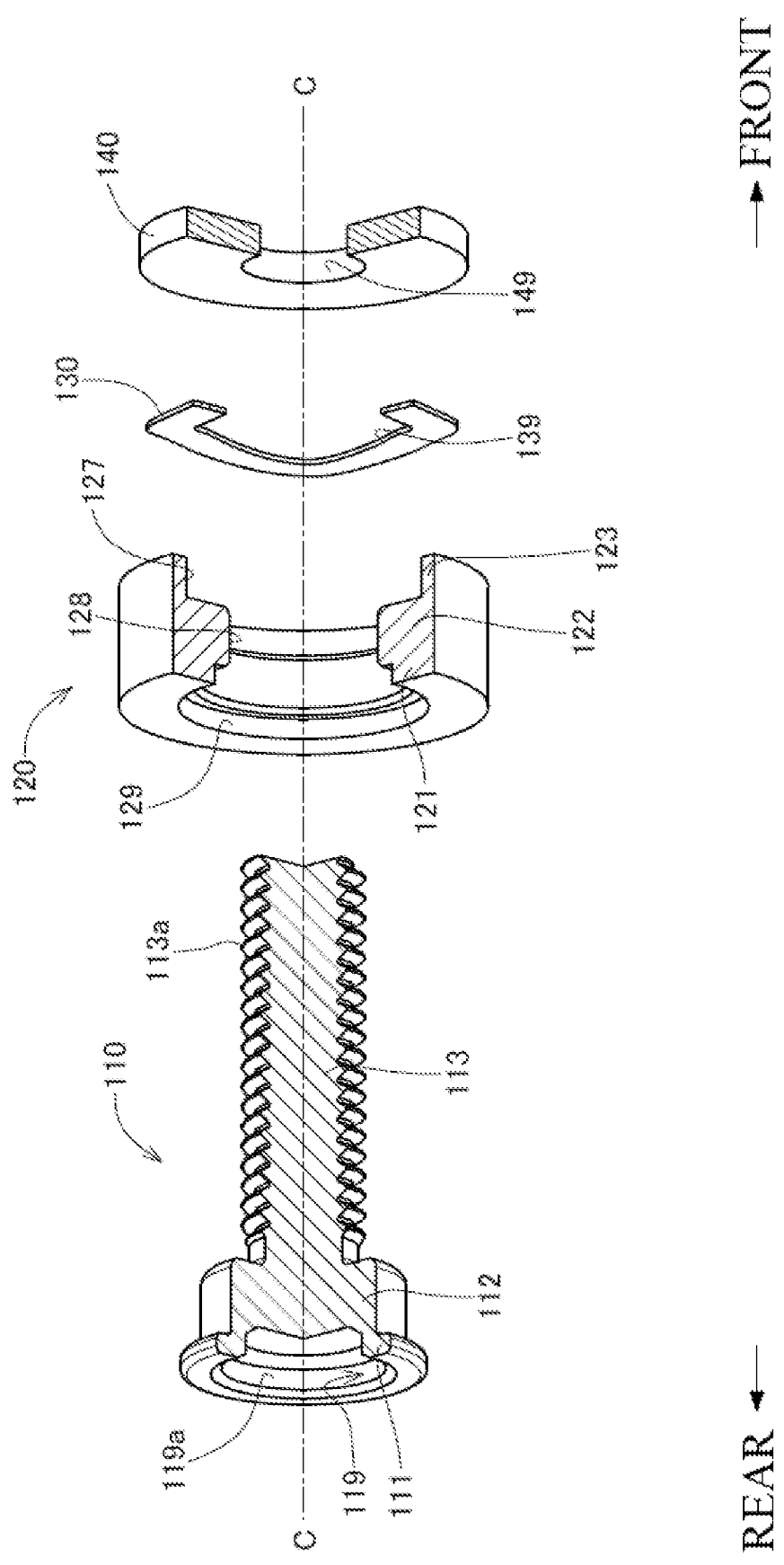
FIG. 1 is an exploded perspective view illustrating a configuration of a fastener as a first embodiment of the present invention.

FIG. 1 is an exploded perspective view illustrating a configuration of a fastener 100 as the first embodiment of the present invention. FIG. 1 illustrates partial cross sections of respective members for indicating shapes of the respective members constituting the fastener 100. Here, the fastener means a device or a component to securely mount (fasten) a member to be fastened to a mating member by screw-fastening.

As illustrated in FIG. 1, the fastener 100 of the first embodiment includes a bolt body 110, a collar 120, a wave washer 130, and a plain washer 140 arranged in this order along the axis line C. In the following, a direction from the bolt body 110 toward the plain washer 140, that is, rightward on the paper surface of FIG. 1 is also referred to as a front, and its opposite direction is also referred to as a rear.

The bolt body 110 is a metal member in which a flange portion 111, a head 112, and a shaft portion 113 are integrally disposed in this order from the rear toward the front. The bolt body 110 is provided with a tool hole 119 that is formed to reach the head 112 from a rear end surface of the flange portion 111. In an inner peripheral surface of the tool hole 119, an inner peripheral surface 119a that has a cylindrical inner surface shape parallel to the axis line C is a surface on which a tool to rotate the bolt body 110 works as described later. Therefore, this inner peripheral surface is also referred to as a tool working surface 119a. The flange portion 111 and the head 112 can be collectively referred to as a tool working portion because the tool hole 119 having the tool working surface 119a as the inner peripheral surface is provided therewith.

The collar 120 is an integrally formed metal member having a column-shaped outer shape, and includes a flange housing portion 121, an intermediate portion 122, and a washer housing portion 123 in this order from the rear toward the front. The flange housing portion 121 is provided with a flange housing hole 129 for housing the flange portion 111, and the intermediate portion 122 is provided with a head insertion hole 128 through which the head 112 passes.

The washer housing portion 123 of the collar 120 is provided with a washer housing hole 127 for housing the entire wave washer 130 and a part of the plain washer 140. The wave washer 130 housed in the washer housing hole 127 is a common wave washer provided with a through hole 139 through which the head 112 is passable, and the plain washer 140 is a common plain washer provided with a through hole 149 through which the shaft portion 113 is passable but the head 112 is not passable.

A2. Exemplary Use of Fastener

Figure 2A:
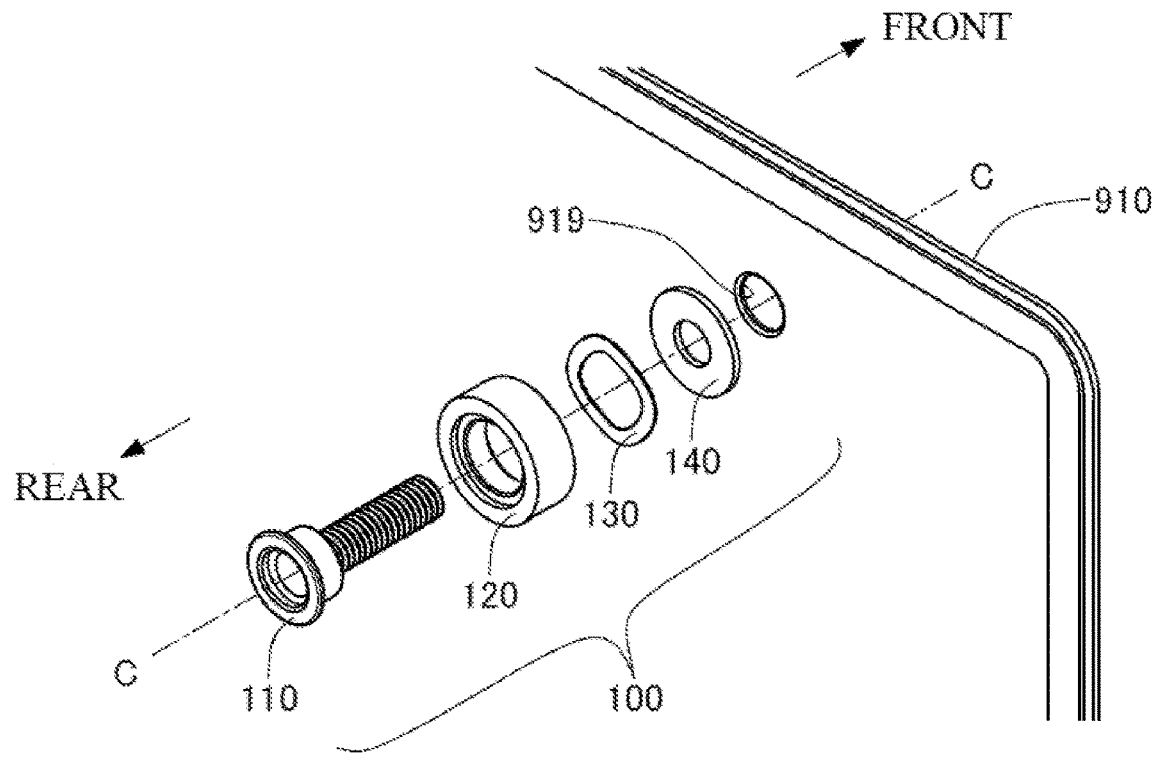
FIG. 2A is an explanatory drawings illustrating a state where the fastener is used for mounting a license plate.
Figure 2B:
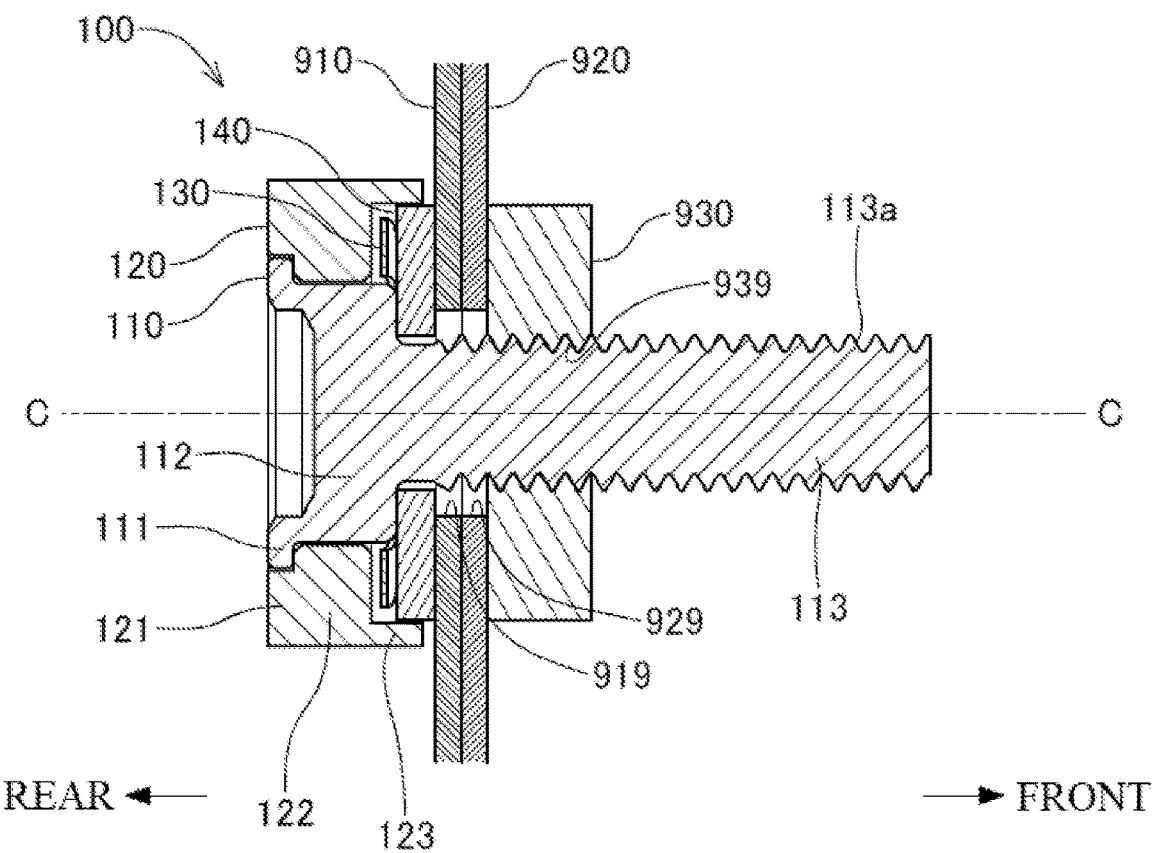
FIG. 2B is an explanatory drawings illustrating a state where the fastener is used for mounting a license plate.

FIGS. 2A and 2B are explanatory drawings illustrating a state where the fastener 100 is used for mounting a license plate 910 as an exemplary use of the fastener 100 of the first embodiment. FIG. 2A illustrates a state where the bolt body 110 of the fastener 100 is passed through a mounting hole 919 provided to the license plate 910 to mount the license plate 910. FIG. 2B illustrates a cross-sectional surface taken along a surface along the axis line C in a state where the license plate 910 is mounted to a mating member 920 as a mounting target using the fastener 100 and a nut 930.

As illustrated in FIG. 2A, the bolt body 110 is inserted through the mounting hole 919 of the license plate 910 in a state where the bolt body 110, the collar 120, the wave washer 130, and the plain washer 140 are arranged from the rear toward the front. The shaft portion 113 of the bolt body 110 inserted through the mounting hole 919 is further inserted through a mounting hole 929 of the mating member 920 arranged on the front side with respect to the license plate 910 (FIG. 2B). Then, a male thread 113a of the shaft portion 113 inserted through the mounting holes 919, 929 of the license plate 910 and the mating member 920, respectively, is threaded with a female thread 939 provided to the nut 930, and the bolt body 110 is rotated in a tightening direction (in the example of FIGS. 2A and 2B, clockwise facing the front) with respect to the nut 930, thereby tightening the license plate 910 to the mating member 920 by the fastener 100 and the nut 930. Thus, the license plate 910 is fastened to the mating member 920.

More specifically, when the bolt body 110 is rotated in the tightening direction with respect to the nut 930, the bolt body 110 advances toward the nut 930 positioned forward. Then, a front end surface of the head 112 contacts a rear end surface of the plain washer 140, thereby applying a load (tightening load) from the front end surface of the head 112 to the rear end surface of the plain washer 140. The tightening load applied to the plain washer 140 is transferred to the nut 930 from the plain washer 140 via the license plate 910 and the mating member 920. Thus, the license plate 910 is tightened to the mating member 920 by the fastener 100 and the nut 930, thereby fastening the license plate 910 to the mating member 920.

Meanwhile, in the state where the license plate 910 is fastened to the mating member 920, while the collar 120 is extruded (biased) rearward by the wave washer 130 so as to be pressed against the flange portion 111, the front end surface of the flange portion 111 contacts the rear end surface of the intermediate portion 122, thereby restricting the rearward movement. However, even in this state, since the collar 120 has a length in the direction of the axis line C of the washer housing portion 123 smaller than a length as a sum of a plate thickness of the wave washer 130 and a plate thickness of the plain washer 140, the collar 120 does not contact the license plate 910. Therefore, while a load by an amount of the biasing force of the wave washer 130 is applied to the collar 120, the tightening load is not applied to the collar 120. Thus, in the fastener 100 of the first embodiment, since the collar 120 does not bear the tightening load larger than the biasing force of the wave washer 130, the collar 120 is rotatable with respect to the bolt body 110.

A3. Function of Fastener

Figure 3:
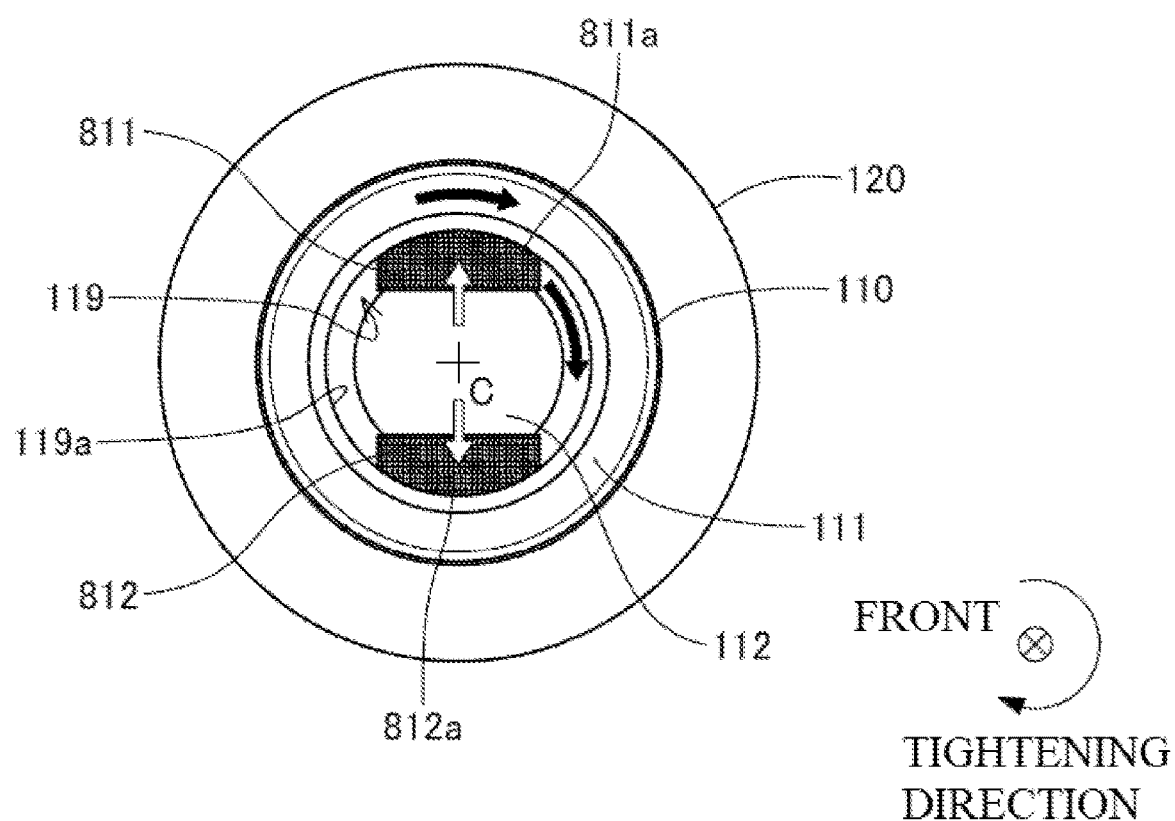
FIG. 3 is an explanatory drawing illustrating a state where a fastening is performed with the fastener of the first embodiment.

FIG. 3 is an explanatory drawing illustrating a state where the fastening is performed in the fastener 100 of the first embodiment. Specifically, FIG. 3 illustrates a state where, by an authentic method, that is, a dedicated tool is used for rotating the bolt body 110 in the tightening direction, thus fastening the member to be fastened by the fastener 100. In FIG. 3, for the tool to rotate the bolt body 110, its entire shape is not illustrated, but a cross-sectional surface of distal end portions 811, 812 taken along the rear end of the tool working surface 119a is illustrated.

As described above, in the inner peripheral surface of the tool hole 119 provided to the bolt body 110, the tool working surface 119a has the cylindrical inner surface shape. Therefore, the tool distal end portions 811, 812 that contact the tool working surface 119a have outer surfaces (operating surfaces) 811a, 812a formed in complementary shapes to the tool working surface 119a, that is, columnar side surface shapes so as to increase areas in contact with the tool working surface 119a.

When the tool distal end portions 811, 812 are inserted into the tool hole 119 and a force in a separation direction is applied to the distal end portions 811, 812 as illustrated by outlined arrows, a load is applied between the operating surfaces 811a, 812a of the tool and the tool working surface 119a of the bolt body 110. In this state, as illustrated by black arrows, rotating the tool distal end portions 811, 812 about the axis line C in the tightening direction generates a torque (tightening torque) that rotates the bolt body 110 in the tightening direction due to a friction between the operating surfaces 811a, 812a and the tool working surface 119a, thus rotating the bolt body 110 about the axis line C in the tightening direction.

At this time, by sufficiently increasing the force in the separation direction applied to the distal end portions 811, 812, the friction generated between the operating surfaces 811a, 812a and the tool working surface 119a is sufficiently increased, thus ensuring sufficiently increasing the tightening torque applied to the bolt body 110. Therefore, since the sufficiently large tightening load can be applied to the member to be fastened by the fastener 100, the member to be fastened can be firmly fastened.

Similarly, in the state where the force in the separation direction is applied to the distal end portions 811, 812, rotating the tool distal end portions 811, 812 about the axis line C in an opposite direction (release direction) of the tightening direction rotates the bolt body 110 about the axis line C in the release direction. In this case, by the force in the separation direction applied to the distal end portions 811, 812 equivalent to that in the tightening, a torque (release torque) in the release direction equivalent to the tightening torque can be generated to the bolt body 110. Therefore, the authentic method using the dedicated tool ensures not only the fastening of the member to be fastened but also the release of the fastened state of the member to be fastened tightly fastened by the fastener 100.

Figure 4A:
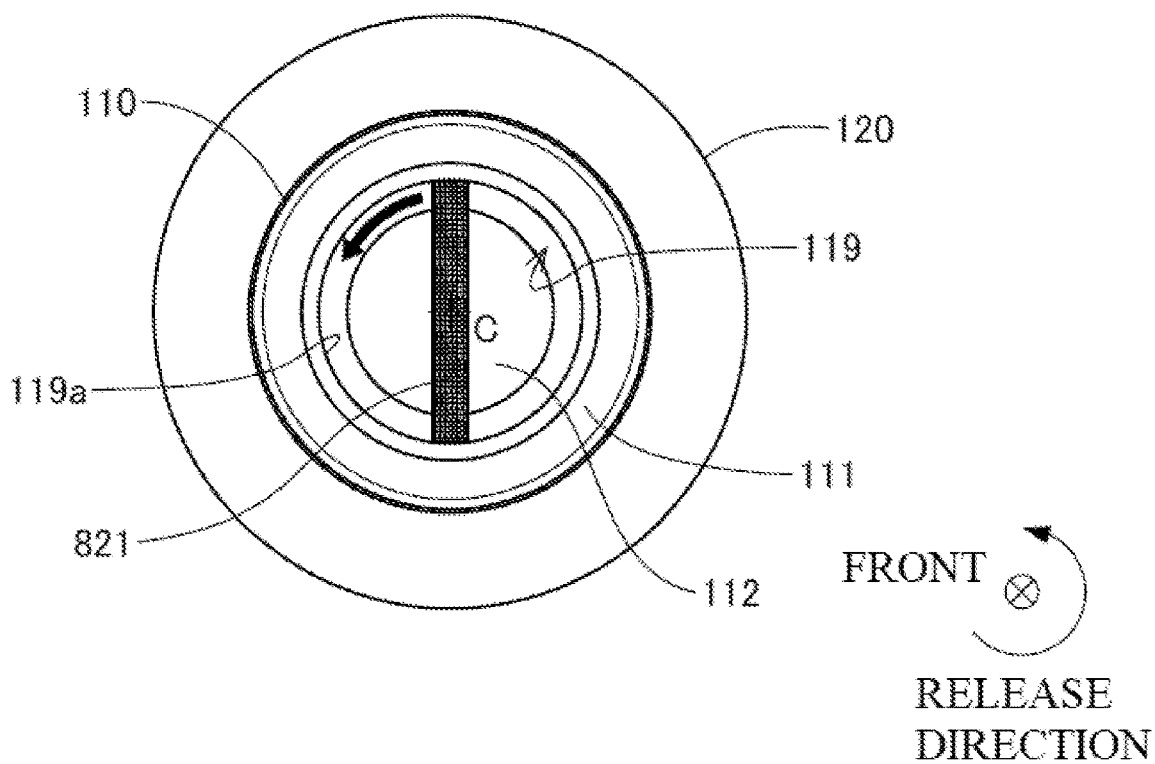
FIG. 4A is an explanatory drawings illustrating a state of attempting to release the fastened state by a fraudulent method.
Figure 4B:
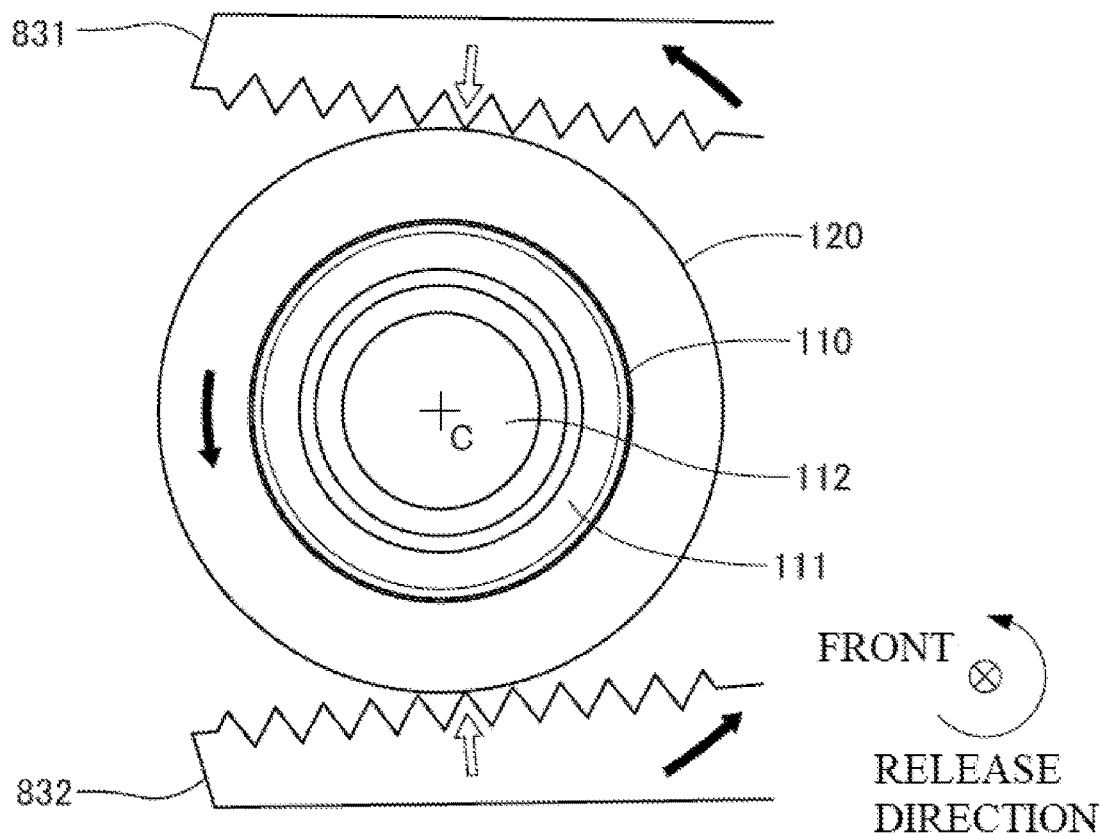
FIG. 4B is an explanatory drawings illustrating a state of attempting to release the fastened state by a fraudulent method.

FIGS. 4A and 4B are explanatory drawings illustrating a state of attempting to release the fastened state by a fraudulent method. FIG. 4A illustrates a state of attempting to release the fastened state by inserting a distal end portion 821 of a tool, such as a driver, into the tool hole 119, and FIG. 4B illustrates a state of attempting to release the fastened state by sandwiching the fastener 100 by distal end portions 831, 832 of a tool, such as pliers.

As described above, since the tool working surface 119a is formed in the cylindrical inner surface shape, as illustrated in FIG. 4A, when the distal end portion 821 of a fraudulent tool is inserted into the tool hole 119 and the distal end portion 821 is rotated about the axis line C in the release direction as illustrated by a black arrow, the distal end portion 821 does not contact the tool working surface 119a in a circumferential direction. Thus, the use of the tool, such as the driver, fails to apply the release torque to the bolt body 110 by the rotation of the distal end portion 821 and fails to rotate the bolt body 110, thus failing to release the fastened state of the member to be fastened made by using the fastener 100 of the first embodiment.

As described above, in the fastened state using the fastener 100, the collar 120 is rotatable with respect to the bolt body 110. Therefore, as illustrated in FIG. 4B, when the fastener 100 is externally sandwiched by the distal end portions 831, 832 of the tool, such as the pliers and the operation to rotate the collar 120 is performed, the bolt body 110 does not rotate, thus failing to release the fastened state. Thus, since the collar 120 has a function to restrict the rotation of the bolt body 110 and the shaft portion 113 included in the bolt body 110 by the external operation, the collar 120 can be also referred to as an external operation restricting portion.

As described above, for the fastener 100 of the first embodiment, the operation by the authentic method using the dedicated tool as illustrated in FIG. 3 ensures the fastening by the fastener 100 and the releasing of the fastening. Meanwhile, as illustrated in FIGS. 4A and 4B, the operation by the fraudulent method not using the dedicated tool fails to release the fastened state by the fastener 100. Therefore, by using the fastener 100 of the first embodiment for mounting the license plate 910 (FIGS. 2A and 2B), inappropriate removal of the license plate 910 can be restricted, thereby ensuring protection from a theft. For the fastener 100 of the first embodiment, the release of the fastened state is restricted with more certainty without filling the tool hole 119 as described above. Therefore, the first embodiment can restrict the release of the fastened state with more certainty while avoiding complicating the fastening work.

Furthermore, for the fastener 100 of the first embodiment, the wave washer 130 and the plain washer 140 are housed in the collar 120. Therefore, since it is also difficult to directly rotate the shaft portion 113 and the plain washer 140 to which the tightening load is applied, the release of the fastened state by the fraudulent method can be restricted with further certainty.

B. SECOND EMBODIMENT

Figure 5:
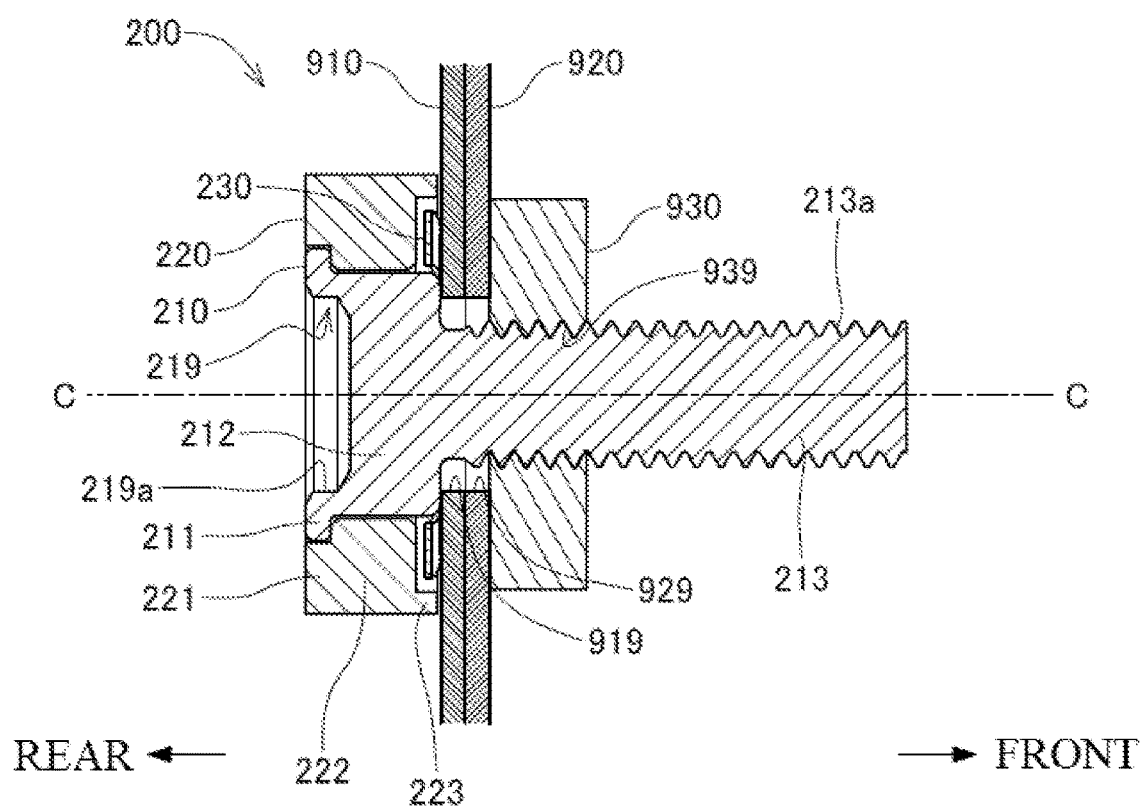
FIG. 5 is an explanatory drawing illustrating a configuration of a fastener in a second embodiment.

FIG. 5 is an explanatory drawing illustrating a configuration of a fastener 200 in the second embodiment. Similarly to FIG. 2B, FIG. 5 illustrates a cross-sectional surface in a state where the license plate 910 is mounted to the mating member 920 using the fastener 200 of the second embodiment. The fastener 200 of the second embodiment is different from the fastener 100 (FIG. 1) of the first embodiment in that the plain washer 140 is omitted. Other configurations of the fastener 200 are similar to the fastener 100 of the first embodiment. Therefore, the description in common with that of the fastener 100 of the first embodiment will be omitted. For the fastener 200 of the second embodiment, the reference numerals having last two digits of the numeral same as those of the fastener 100 of the first embodiment and the hundreds digit changed to "2" are attached to the components corresponding to the components of the fastener 100 of the first embodiment. Similarly, in this description, even when the specific explanations are omitted, the reference numerals having the common last two digits of the numerals are attached to the corresponding components.

As described above, while the plain washer 140 is omitted in the fastener 200 of the second embodiment, a length of a washer housing portion 223 of a collar 220 is shortened to cause a front end surface of a bolt body 210 to contact the license plate 910. Therefore, also in the second embodiment, since the tightening load can be applied to the license plate 910 from the front end surface of the bolt body 210, the license plate 910 is fastened to the mating member 920 similarly to the first embodiment.

However, for the fastener 200 in the second embodiment, since the bolt body 210 rotating during the tightening is in contact with the license plate 910, a scratch is possibly generated on a rear surface of the license plate 910 due to the rotation of the bolt body 210. Meanwhile, for the fastener 100 in the first embodiment, while the bolt body 110 rotating during the tightening contacts the plain washer 140, the plain washer 140 is configured not to rotate with respect to the license plate 910. Therefore, the first embodiment suppresses the scratch generated on the license plate 910. In this respect, the first embodiment is more preferable than the second embodiment. Meanwhile, with the second embodiment, since the number of the members constituting the fastener 200 can be reduced by omitting the plain washer 140, the configuration of the fastener 200 can be simplified and the manufacturing cost of the fastener 200 can be reduced. In this respect, the second embodiment is more preferable than the first embodiment.

C. THIRD EMBODIMENT

Figure 6:
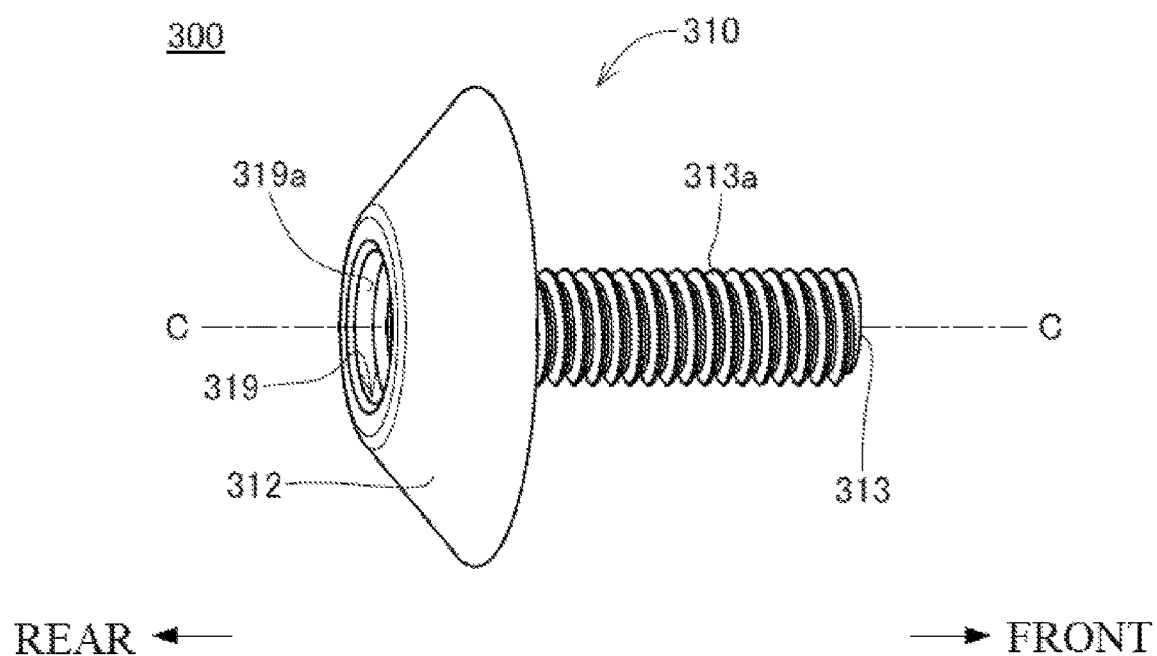
FIG. 6 is a perspective view illustrating a configuration of a bolt as a third embodiment.

FIG. 6 is a perspective view illustrating a configuration of a fastener 300 in a third embodiment. As illustrated in FIG. 6, the fastener 300 of the third embodiment is configured as a single bolt 310 corresponding to the bolt bodies 110, 210 of the first and second embodiments.

As illustrated in FIG. 6, the fastener 300 in the third embodiment, that is, the bolt 310 includes a head 312 disposed on the rear side, and a shaft portion 313 that extends forward from a front end surface of the head 312 and is provided with a male thread 313a. Then, a tool hole 319 is provided to a rear end surface of the head 312 similarly to the tool holes 119, 219 provided to the flange portions 111, 211 and the heads 112, 212 in the first and second embodiments, and a tool working surface 319a has a cylindrical inner surface shape. Therefore, also in the third embodiment, as illustrated in FIG. 4A, the release of the fastening using the tool, such as the driver, is restricted.

Meanwhile, for the fastener 300 of the third embodiment, a side surface of the head 312 has a tapered shape in which the outer diameter increases toward the front (that is, a direction from the head 312 toward the shaft portion 313). Therefore, as illustrated in FIG. 4B, when the release of the fastening is attempted through an external rotating operation using the tool, such as the pliers, the distal end of the tool slips on the side surface of the head 312 and fails to sandwich the head 312, thus ensuring the restricted rotation of the shaft portion 313 to restrict the release of the fastening. Thus, since the side surface of the head 312 has a function to restrict the rotation of the shaft portion 313 by the external operation, the side surface of the head 312 can be also referred to as an external operation restricting portion similarly to the collars 120, 220 of the first embodiment and the second embodiment.

Thus, also by the fastener 300 of the third embodiment, the fastening by the fastener 300 and the release of the fastening can be performed through the operation by the authentic method using the dedicated tool as illustrated in FIG. 3. Meanwhile, as illustrated in FIGS. 4A and 4B, the operation by the fraudulent method not using the dedicated tool fails to release the fastened state by the fastener 300. Therefore, also the third embodiment ensures restricting the release of the fastened state with more certainty while avoiding complicating the fastening work.

Furthermore, the fastener 300 of the third embodiment is configured as the single bolt 310 different from the fasteners 100, 200 of the first and second embodiments. Therefore, the third embodiment is more preferable than the first and second embodiments in that the configuration of the fastener 300 is more simplified and further the manufacturing cost can be reduced. Meanwhile, the first and second embodiments are more preferable than the third embodiment in that the rotations of the shaft portions 113, 213 by the external operation can be restricted with more certainty.

While the side surface of the head 312 has the tapered shape in the third embodiment, the side surface of the head generally only needs to be formed so as to have the outer diameter increasing toward the front (that is, toward the shaft portion 313). For example, the shape of the side surface of the head may be a rounded shape like a truss screw. Also with such a shape, the rotation of the shaft portion by the external operation can be restricted.

D. MODIFICATION

The present invention is not limited to the embodiments described above, but can be implemented in various aspects without departing from the gist of the invention. For example, the following modifications can be made.

D1. Modification 1

While the wave washers 130, 230 are used to bias the collars 120, 220 rearward in the fastened state in the first and second embodiments described above, elastic members, such as a rubber, may be used to bias the collars 120, 220 instead of the wave washers 130, 230. However, as the example of use described above, when the fasteners 100, 200 are used for mounting the license plate 910, from the aspect of weather resistance, the wave washers 130, 230 made of metal are preferably used.

The biasing member, such as the wave washers 130, 230, can be omitted. In this case, when the collars 120, 220 move in the axis line C direction and contact the bolt bodies 110, 210 and the member to be fastened (license plate 910 in the example of use described above), an abnormal noise could occur. Therefore, like the first and second embodiments, the collars 120, 220 are preferably biased rearward by the biasing member, such as the wave washers 130, 230.

D2. Modification 2

While the flange portions 111, 211 are disposed to the bolt bodies 110, 210 to hold the collars 120, 220 between the flange portions 111, 211 and the license plate 910 (member to be fastened) in the first and second embodiments, the collar can be held by another method. For example, it is allowed that the flange portion is omitted, mutually mating depressed portion and projecting portion are disposed between the collar and the head, and the projecting portion is fitted into the depressed portion, thereby restricting the movement of the collar in the axial direction.

Figure 7:
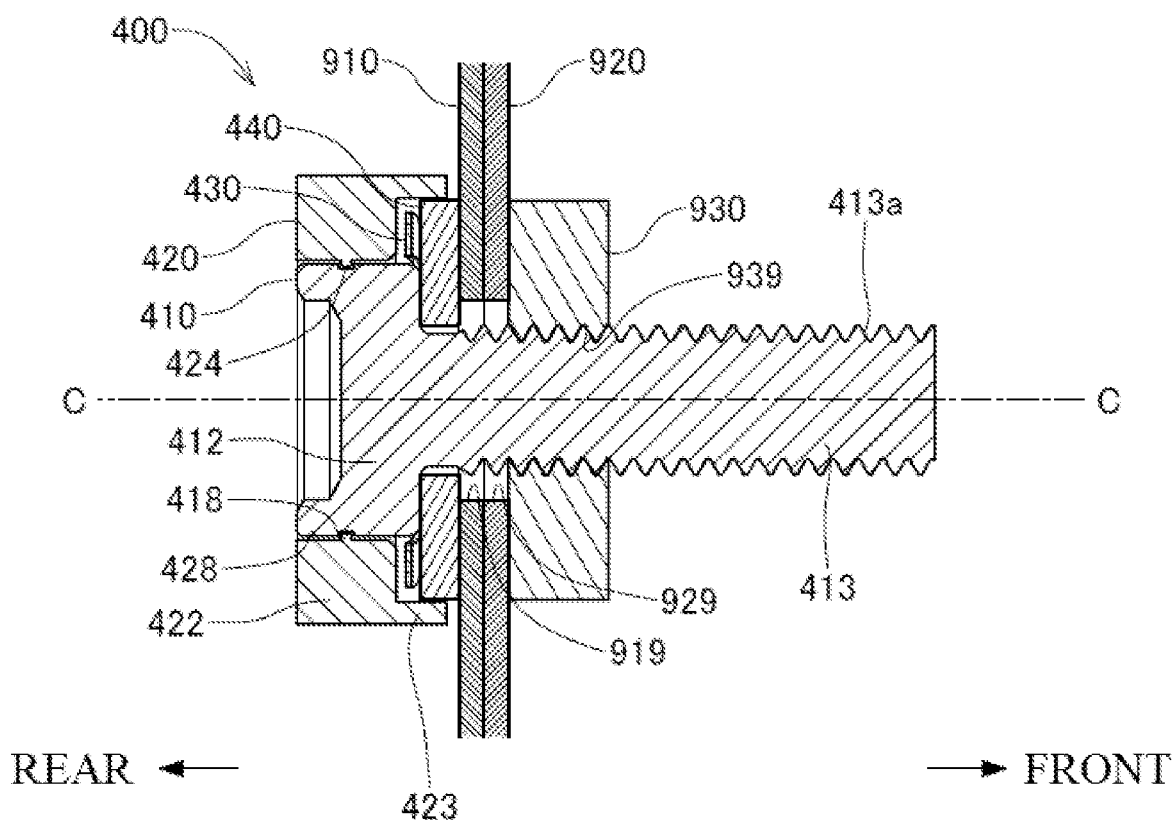
FIG. 7 is an explanatory drawing illustrating a modification of the fastener.

Specifically, like a fastener 400 illustrated in FIG. 7, a groove 418 may be provided to a side surface of a head 412 of a bolt body 410, and a projecting portion 424 may be disposed to an inner surface of a head insertion hole 428 provided to a head insertion portion 422 (corresponding to the intermediate portions 122, 222 of the first and second embodiments) of a collar 420, thus fitting the projecting portion 424 into the groove 418 of the bolt body 410. Also with this configuration, since the tightening load in the fastening of the member to be fastened (license plate 910) using the fastener 400 is not applied to the collar 420, the collar 420 is rotatable with respect to the bolt body 410. The projecting portion 424 can be fitted into the groove 418 by a well-known technique, such as press fitting and shrinkage fitting.

D3. Modification 3

While the tool working surfaces 119a, 219a, and 319a of the inner surfaces of the tool holes 119, 219, and 319 are formed in the cylindrical inner surface shapes in the respective embodiments, the shape of the tool working surface does not necessarily need to be the cylindrical inner surface shape but may be an approximately cylindrical inner surface shape. Here, the approximately cylindrical inner surface shape means a shape in which a contact that gives a sufficient torque to the bolt body does not occur in the circumferential direction between the distal end portion of the fraudulent tool and the tool working surface, for example, an ellipse having sufficiently small ellipticity in a shape viewed from the rear and a shape in which a part of the circumference is replaced with a straight line.

D4. Modification 4

While the fasteners 100, 200, and 300 are used for mounting the license plate 910 in the respective embodiments, the fasteners 100, 200, and 300 can be used for fastening various members to be fastened for which the operation to release the fastening is preferred to be restricted. As this member to be fastened, a switchboard lid that requires consideration for safety, a lid of communication wiring device and the like that requires consideration for secrecy and stability, a fixing member for an outdoor installation object that could be possibly stolen, and the like are included.

What is claimed is:

1. A fastener for fastening a member to be fastened using a tool, comprising:
   a shaft portion provided with a male thread configured to be rotated about an axis line to work so as to fasten the member to be fastened;
   a tool working portion integrated with the shaft portion, the tool working portion having a tool working surface and a flange connected to the tool working surface, the tool working surface being arranged to receive the tool to rotate the shaft portion;
   a collar disposed on an outer peripheral side of the tool working portion and configured to restrict the rotation of the shaft portion through an operation from outside the fastener; and
   a biasing member arranged to be disposed between the flange of the tool working portion and the member to be fastened in a state where the member to be fastened is fastened and configured to press the collar against the flange of the tool working portion, wherein
   the tool working surface is formed in an approximately cylindrical inner surface shape,
   wherein the collar houses the tool working portion and the biasing member and is arranged to be rotatably held between the flange of the tool working portion and the member to be fastened in the state where the member to be fastened is fastened.

2. The fastener according to claim 1, further comprising a washer disposed between the tool working portion and the member to be fastened, the washer transmitting a tightening load applied to the member to be fastened by the tool working portion, wherein
   the collar is configured to house a part of the washer.

3. The fastener according to claim 1, wherein
   the collar has a first side and a second side opposite from the first side and facing the member to be fastened by the tooled porting portion,
   the first side includes a first opening to house the flange of the tool working portion and is flush with a surface of the flange in the state where the member to be fastened is fastened, and
   the second side includes a second opening to house the biasing member.

4. The fastener according to claim 1, wherein
   the biasing member is a wave washer providing a biasing force for pressing the collar against the flange of the tool working portion.

* * * * *